Sept. 21, 1965 C. F. STODDARD ETAL 3,207,403
PALLET MAKING MACHINE
Filed May 6, 1963 8 Sheets-Sheet 2

INVENTOR.
Clarence F. Stoddard and
Ronald T. Hopkins
BY
Joseph P. Gastel
ATTORNEY.

Sept. 21, 1965 C. F. STODDARD ETAL 3,207,403
PALLET MAKING MACHINE

Filed May 6, 1963 8 Sheets-Sheet 4

Fig. 5.

INVENTOR.
Clarence F. Stoddard and
Ronald T. Hopkins
BY
Joseph P. Gastel
ATTORNEY.

Sept. 21, 1965                C. F. STODDARD ETAL                3,207,403
                              PALLET MAKING MACHINE
Filed May 6, 1963                                             8 Sheets-Sheet 6

INVENTOR.
Clarence F. Stoddard and
Ronald T. Hopkins
BY

Joseph P. Dastel
ATTORNEY.

Sept. 21, 1965  C. F. STODDARD ETAL  3,207,403
PALLET MAKING MACHINE

Filed May 6, 1963  8 Sheets-Sheet 8

INVENTOR.
Clarence F. Stoddard and
Ronald T. Hopkins
BY
Joseph P. Gastel
ATTORNEY.

United States Patent Office 3,207,403
Patented Sept. 21, 1965

3,207,403
PALLET MAKING MACHINE
Clarence F. Stoddard, Batavia, and Ronald T. Hopkins, Attica, N.Y.; said Ronald T. Hopkins assignor to Clarence F. Stoddard
Filed May 6, 1963, Ser. No. 278,152
15 Claims. (Cl. 227—101)

The present invention relates to an improved machine for the making of pallets.

In recent years the use of palelts for transporting and storing merchandise has increased. These pallets consist of a plurality of slats which are secured by nails to a plurality of stringers which generally extend substantially perpendicularly to said slats. In the past the pallets were made either by hand or by relatively expensive and complicated machines. The pallets which were made by hand were excessively expensive because of a high labor cost. The machines which were used to make pallets were relatively complicated in that they required a relatively large number of nailing heads for driving nails through the assembled slats and stringers and the large number of nailing heads greatly increased the cost of the machines. Furthermore because of the orientation of the various operating components of the prior art pallet making machines, it was difficult to service them and they also required relatively complex linkages which were subject to frequent malfunction. In addition, the prior art pallet making machines were extremely cumbersome and therefore not only required a large amount of floor space but also could not be readily moved from place to place within a factory. It is with the overcoming of the foregoing shortcomings of prior art pallet making machines that the present invention is concerned.

It is accordingly one important object of the present invention to provide an improved pallet making machine which uses a minimum number of nailing heads integrated into the machine in a unique manner, thereby greatly decreasing the cost of the machine and also minimizing the possibility of malfunctions. A related object of the present invention is to provide an improved pallet making machine which will automatically drive nails through a slat into a stringer so that the nails through said slat will be in staggered relationship to the longitudinal axis of the stringer, to thereby prevent the stringer from cracking as a result of receiving a plurality of closely spaced nails in a single grain thereof.

Another object of the present invention is to provide an improved pallet making machine which includes a conveyor which is uniquely integrated with the nailing machine portion thereof, so that the conveyor not only positively feeds an assembled pallet through the machine, but also can be adjusted relative to the nailing machine in an extremely simple manner to accommodate different sized pallets.

Another object of the present invention is to provide an improved pallet making machine in which a great number of the mechanical linkages and drives associated therewith are mounted on a platform above the conveyor portion of the machine, thereby not only simplifying the 'inkages but also permitting easy access to the various )arts of the machine.

A further object of the present invention is to provide an improved pallet making machine including a conveyor and nailing mechanism associated therewith which is of extremely lightweight construction and therefore capable of being manufactured at a low cost, but is still sufficiently rugged for manufacturing conventional pallets. A related object of the present invention is to provide an improved pallet making machine including a conveyor arrangement and a nailing mechanism which is not only relatively lightweight but also has the center of gravity thereof located approximately centrally of the machine so that it can readily be moved from place to place with a minimum of effort.

A still further object of the present invention is to provide an improved automatically operating construction for positively delivering single nails from a hopper to a predesignated location for driving through assembled objects. A related object of the present invention is to provide an improved nail delivery construction which can deliver nails in predetermined timed relationship to cycles of a nailing machine, that is, it can deliver nails with every cycle of the machine or skip cycles, as required.

Yet another object of the present invention is to provide an improved pallet making machine which can either be operated manually or automatically. A related object of the present invention is to provide an improved pallet making machine which can be programmed to automatically provide various nailing patterns.

Another object of the present invention is to provide an improved conveyor construction for a pallet making machine which not only advances a pallet but which also positively guides rough lumber notwithstanding that said rough lumber possesses large dimensional variations. A related object of the present invention is to provide an improved conveyor for use in a pallet making machine which is capable of being used for making different types of pallets without extensive modifications. Other objects and attendant advantages of the present invention will readily be perceived hereafter.

The improved pallet making machine of the present invention includes a conveyor and a nailing machine associated therewith. The conveyor includes a plurality of longitudinal guides for receiving the pallet stringers upon which the slats are positioned. The conveyor also includes a continuous chain drive to convey the assembled pallets from an assembly station to a position proximate the nailing machine. The conveyor is vertically adjustable relative to the nailing machine, by the use of single jacks which vary the height of the bed of the conveyor, to thereby permit it to accommodate different thicknesses of pallets and also for determining the amount of countersink which the nails joining the stringers and slats have in their fully driven position. By adjusting the conveyor, rather than the nailing machine, once the nailing machine is set for proper operation, it need not be readjusted, thereby preventing the possibility of the improper operation thereof resulting from the improper adjustment of the nailing machine for different sizes of pallets. Furthermore, the guides for the stringers are spring loaded to permit them to accommodate stringers which are made from rough lumber having extreme dimensional variations.

The nailing machine is mounted on the frame of the pallet making machine and has a plurality of spaced nailing heads extending transversely to the direction of feed of the conveyor. The nailing heads automatically drive nails through the assembled slats and stringers. Associated with each of the nailing heads is a hopper for receiving a quantity of loose nails. The hoppers are agitated by suitable structure to cause the loose nails, which are originally dumped into the hopper in a random manner, to become aligned in a predetermined path. Thereafter the agitation of the hoppers causes the aligned nails to travel into a guide which leads to an improved nail picker which forms a part of the present invention. The improved nail picker includes mechanism for positively picking only a single nail from the guide in timed relationship to the operation of the nailing machine. A chute is associated with the nail picker for conveying a nail thus picked to a nailing head having an aligning mechanism which holds the nail until such time as mechanism associated with the nailing head is actuated to drive the nail through the preoriented slat and stringer. It will be appreciated that an improved nail picker is associated with each of the nailing heads which are spacedly mounted transversely of the conveyor, as noted above. By suitable modification of the nail pickers, certain of the nail pickers can transmit nails with each nailing cycle of the machine whereas other nail pickers can skip cycles of the machine. This permits a pallet to be made, for example, with two nails driven through the ends of each slat and only one nail driven through the center of the slat.

In accordance with the present invention a minimum of nailing heads are used because such heads are oscillatable in unison. In this respect it is to be noted that when two adjacent nails are driven through a stringer, the nails should not be in alignment. The reason for this is that when nails are driven in a line they will enter the same grain of the stringer and thereby tend to cause it to crack. By causing certain nailing heads to oscillate in a direction transversely of the length of the conveyor after each nailing operation, the adjacent nails which are driven through the stringers will be in staggered relationship, that is, out of alignment, and therefore will not enter the same grain of the stringer. The foregoing oscillation of the nailing heads is automatic and in timed relationship to the operation of the nailing heads, thereby obviating any possibility that two or more adjacent nails will be driven in alignment through a stringer. It can thus be seen that since single nailing heads are capable of oscillating to stagger the nails driven thereby, there need be only a single nailing head associated with each of the stringers. This obviates the necessity for the use of a plurality of expensive nailing heads for each stringer, thereby greatly reducing the cost of the instant machine. Furthermore, since the nailing heads are mounted transversely to the machine and since pallets have less stringers than slats, the number of nailing heads is held to a minimum, whereas if the nailing heads were mounted longitudinally of the machine so that they would act on a plurality of slats at substantially the same time, a greater number of nailing heads would be required. Therefore because of the transverse orientation of the nailing heads relative to the conveyor and because of their ability to oscillate, the number of nailing heads is held to a minimum and the expense of the nailing machine is minimized. A single mechanism is incorporated in the drive for oscillating the nailing heads to permit the amount which they oscillate to be adjusted, to thereby vary the amount which the nails are staggered, to be set in a simple manner.

As noted above, the pallet making machine includes a conveyor and a plurality of transversely oriented nailing heads mounted on the same frame as the conveyor and centrally thereof. Most of the drives and associated mechanical linkages for the nailing machine are mounted on a platform above the conveyor. This not only permits the conveyor to be free so that it cannot possibly interfere in any way with operation of the various linkages but also permits ready access to the various linkages and drives for adjustment and repair. In addition, because of the mounting of the various linkages above the conveyor they can be engineered to meet their specific function without requiring that they be modified to make allowance for the conveyor.

The center of gravity of the combined conveyor and nailing machine is located substantially centrally of the length of the conveyor and structure is provided for permitting the frame of the combined conveyor and nailing heads to be lifted onto suitable dollies at the central portion thereof to thereby permit the improved pallet making machine to be shifted from location to location within a plant, as required.

The improved pallet making machine of the present invention is capable of manual operation in the sense that controls are provided for advancing the conveyor a predetermined amount to bring desired portions of an assembled pallet under the nailing heads. Furthermore the nailing mechanism which causes nails to be driven and the nailing heads to be oscillated, as noted above, may be selectively energized to provide a single nail driving and oscillating operation in response to the actuation of a single control. In this type of operation the nailing machine will come to rest after each nail driving operation and it can be selectively triggered thereafter after the conveyor has been advanced a predetermined amount, as noted above. It is to be especially noted, however, that the oscillation of the nailing heads is entirely automatic and occurs incidental to a nail driving operation. Because of this arrangement it is impossible for an adjacent pair of nails to be driven through a stringer. It is to be also noted that the present invention includes a fully automatic embodiment which is capable of causing a complete pallet to be made once the machine is energized. In this respect the automatic control for the present invention includes a programming arrangement which causes nails to be driven through slats at predetermined spaced points in staggered relationship without requiring any attention on the part of the machine operator.

The present invention will be more fully understood when the following portions of the specification are read in conjunction with the accompanying drawings wherein.

Figure 3:
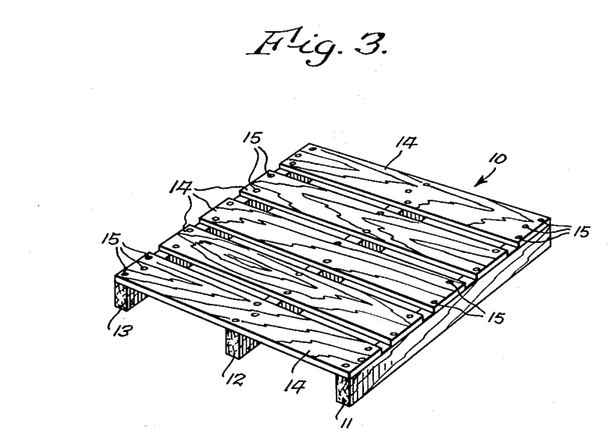
FIG. 3 is a perspective view of a pallet which is made by the machine of the present invention and showing the staggering of the nails which are driven by the machine.

In FIG. 3, there is shown a pallet 10 which is made by the improved pallet making machine of the present invention. Pallet 10 includes a plurality of stringers 11, 12, and 13 which are spaced apart and have slats 14 nailed thereto. It is to be noted that the nails 15 in each slat are staggered so they do not enter the same grain of the stringer to thereby prevent cracking of the stringers.

Figure 1:
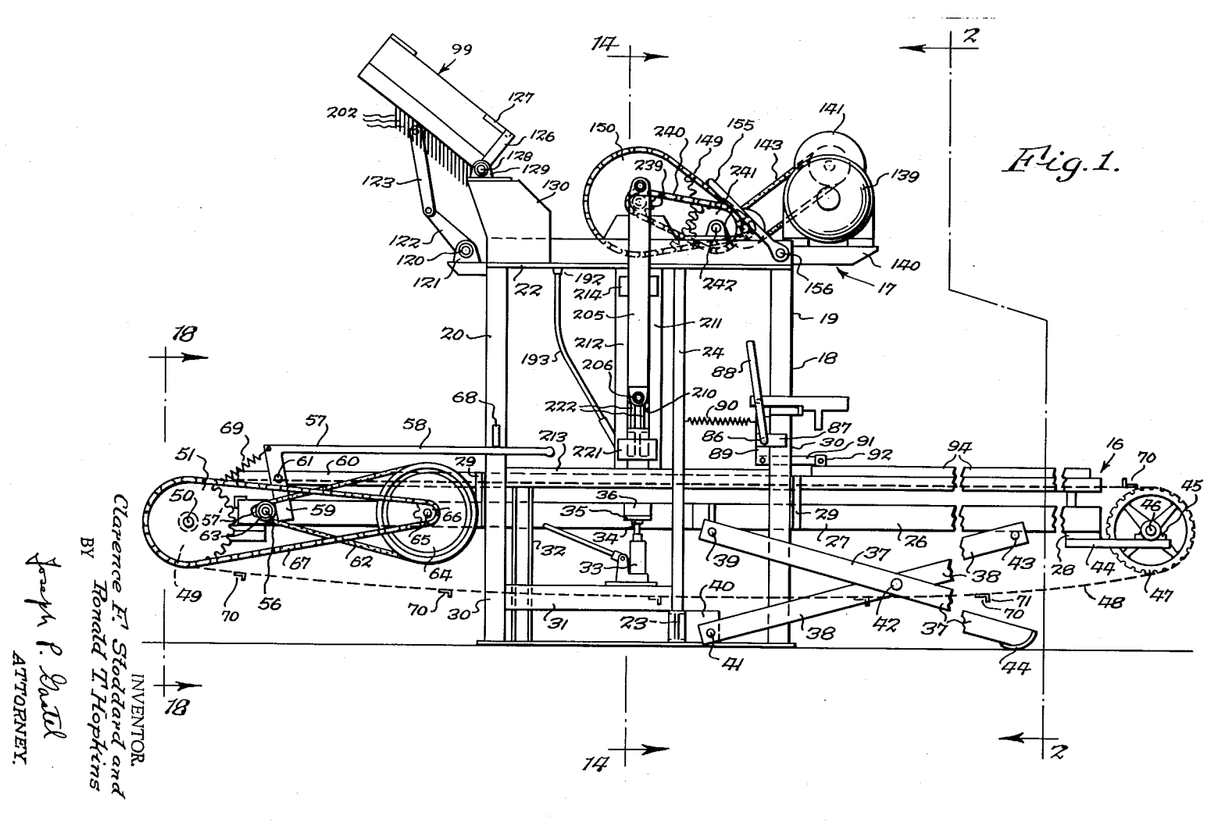
FIG. 1 is a side elevational view of the improved pallet making machine of the present invention with certain parts omitted in the interest of clarity.

A portion of the improved pallet making machine of the present invention is shown in FIG. 1, certain parts of the machine having been omitted in the interest of clarity. The machine includes a conveyor portion 16 and a nailing portion 17 both having a common frame 18. Frame 18 includes a plurality of upright members 19 and 20 which have their bottom ends suitably secured as by welding to plate 21 and their upper ends supporting platform 22 which carries various of the mechanical drives and linkages which will be described hereafter. An I beam or the like 23 is suitably secured to plate 21 as by welding and extends beyond the edges of the plate. Supporting frame members 24 (FIG. 2) extend between I beam 23 and platform 22 to thereby lend rigidity to the frame. At this point it is to be noted that I beam 23 which is mounted on bottom plate 21 is located substantially at the center of gravity of the combined nailing machine and conveyor. From FIG. 2 it can be seen that apertures 25 are provided at opposite ends of I beam 23. If it is desired to move the machine of FIG. 1 from location to location within a factory, it is merely necessary to utilize apertures 25 to receive pins on a dolly or the like after the entire machine is jacked up in the vicinity of I beam 23 to thereby permit the entire machine to be easily moved as desired.

The conveyor 16 (FIGS. 1, 2, and 4) is integrated onto frame 18 in a unique manner. The bed 26 of conveyor 16 includes a plurality of longitudinally extending frame members 27 (FIGS. 1, 2, and 4) which are joined to each other by cross members 28, as by welding. As can be seen from FIGS. 1 and 2, guide members 29, which are essentially angle irons, have first legs thereof suitably welded to frame members 27 at spaced locations. The facing surfaces of the other legs of guide members 29 are in contiguous relationship with the surfaces 30 of upright frame members 19 and 20. As will be described hereafter, conveyor 16 may be moved in a vertical direction relative to frame 18 and it is guide members 29 in conjunction with surfaces 30 which guide conveyor 16 in a vertical direction. More specifically in the foregoing respect, frame 18 includes a horizontal I beam 31 (FIG. 1) having the left end portion thereof welded to vertical brace 32 and to upright frame member 20. The right end of member 31 rests on and is welded to I beam 23 and is also welded to brace 24. A jack 33 rests on brace 31 and the head 34 of jack 33 engages portion 35 of angle plate 36 which is welded to longitudinal frame member 27 of conveyor 16. Another jack such as 33 is provided on the opposite side of frame 18. When it is desired to elevate the bed 26 of conveyor 16, it is merely necessary to manipulate jacks 33 in the conventional manner to cause said bed 26 to move upwardly or downwardly to thereby adjust the vertical position of the bed relative to the nailing structure which will be described hereafter at a suitable portion of this description. During the jacking action guides 29, described above, will guide bed 26 in a perfectly rectilinear direction relative to the uprights 19 and 20 of frame 18.

It is to be especially noted that the bed 26 of conveyor 16 is self leveling in that it includes a scissors linkage having legs 37 and 38 (FIG. 1). The upper end of leg 37 is pivotally secured relative to frame member 27 by pin 39. The lower end of leg 38 is pivotally secured to plate 40 mounted on base plate 21 by pin 41. Legs 37 and 38 are pivotally secured to each other at their central portion by pin 42. A supporting pin 43, or the like, is mounted on the upper end of leg 38 and pin 43 can move relative to elongated member 27 while supporting the undersurface thereof. The lower end of leg 37 has a shoe 44 mounted thereon which is adapted to slide on the floor. It can therefore be seen that whenever jacks 33 are manipulated to raise or lower bed 26 of conveyor 16 the scissors linkage 37, 38 will automatically adjust itself to support the bed in whatever position it has been moved to. As can be seen from FIG. 2, a scissors arrangement 37, 38 is provided on each side of bed 26.

Figure 4:
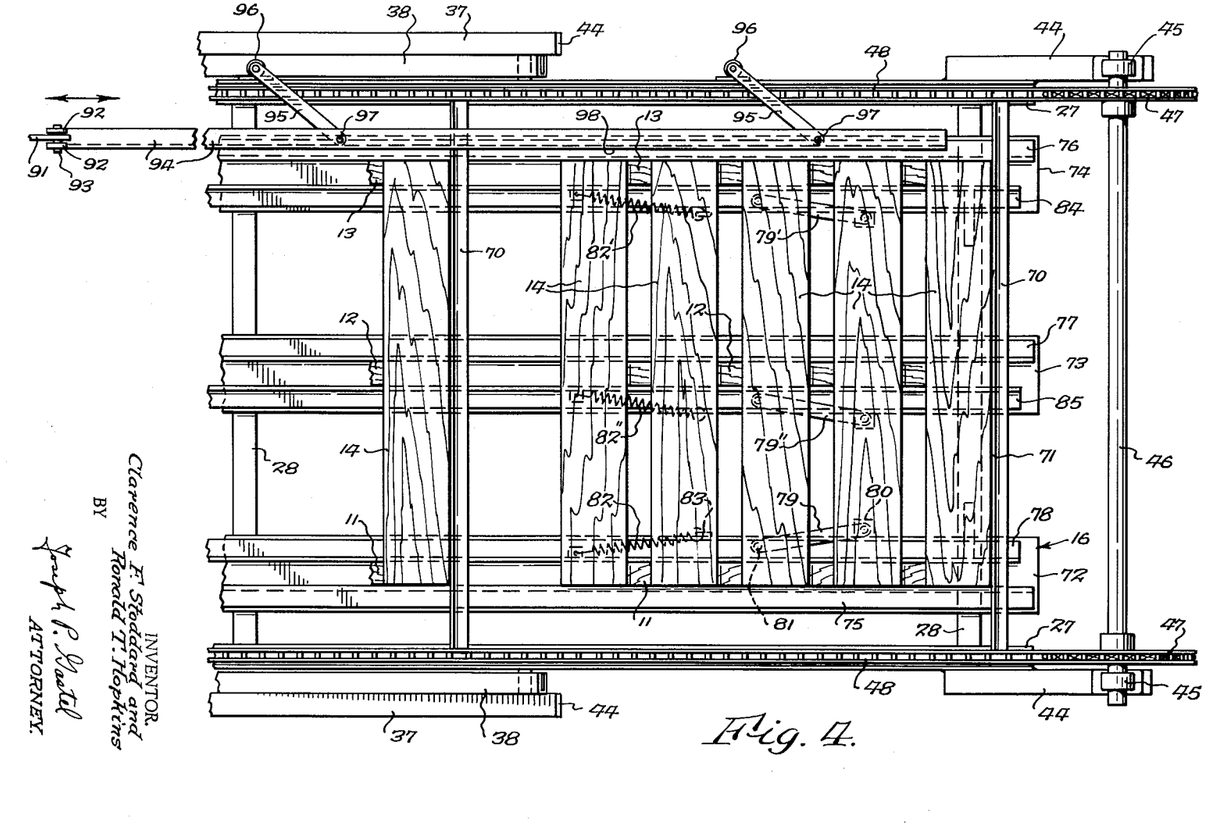
FIG. 4 is a plan view of the right end of the conveyor shown in FIG. 1 and showing a pallet assembled thereon for subsequent nailing, FIG. 4 also showing related mechanism for aligning the various elements of the pallet prior to feeding them to the nailing portion of the pallet making machine.
Figure 18:
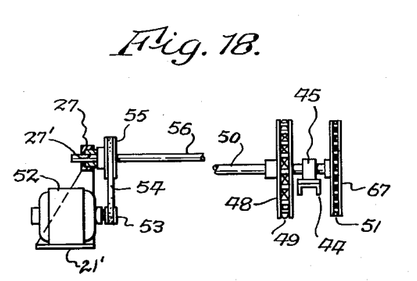
FIG. 18 is a view of the clutch mechanism for the conveyor and is taken substantially along line 18—18 of FIG. 1.

From FIGS. 1 and 4 it can be seen that members 44 are welded to frame members 27 and and cross members 28. The extreme right ends of members 44 mount bearings 45 which journal shaft 46 for rotation therein. Mounted on shaft 46 are a pair of spaced sprockets 47 which receive spaced chains 48. Suitably mounted on the left end of conveyor 16 (FIG. 1) are a pair of spaced sprockets 49, each of which cooperates with a sprocket 47 to support a chain 48 therebetween. Sprockets 49 are mounted on shaft 50 in the same manner as described above relative to sprockets 47. Bearings (not shown) support shaft 50 in the same manner as shaft 46. A drive sprocket 51 (FIG. 18) is also mounted on shaft 50. In order to drive sprockets 49 and therefore cause chains 48 to travel, it is merely necessary to energize motor 52 which is mounted on plate 21' which is mounted on frame member 27 so that it can move therewith. The output shaft of motor 52 has a pulley 53 thereon which drives belt 54 which in turn drives pulley 55 which is mounted on shaft 56 (FIGS. 1 and 18). A first end of shaft 56, proximate pulley 55, is mounted for rotation in aperture 27' in frame member 27 on one side of bed 26. The aperture in which said first end of shaft 56 is mounted is slightly larger than shaft 56 but is not a slot such as 57' in frame member 27 on the opposite side of bed 26 in FIG. 1. Slot 57' supports a second end of shaft 56. Shaft 56 will rotate all of the while that motor 52 is energized. However, chains 48 will not be driven unless clutch lever 57 is actuated. Clutch lever 57 essentially comprises a lever type of mechanism having a handle 58 and a shoe leg 59, the latter being pivoted on frame member 60 by pin 61. It can readily be visualized that if it is desired to drive chains 48 it is merely necessary to move handle 58 downwardly in a clockwise direction about pivot 61. This will cause shoe 59 to also move in a clockwise direction to engage shaft 56 or a suitable bearing mounted thereon, to thereby cause said shaft to move to the left in FIG. 1. In the foregoing respect, the first end of shaft 56 will pivot about its connection with frame member 27 at 27' and the second end of shaft 56 will move to the left in slot 57' (FIG. 1). This will cause tightening of belt 62 which encircles both pulley 63, which is mounted on shaft 56, and pulley 64.

When belt 62 is tightened, the rotation of shaft 56 is transmitted to pulley 64. Pulley 64 in turn is mounted on a stub shaft 65 which in turn is mounted on frame member 27. Shaft 65 also mounts sprocket 66. Thus pulley 64 and sprocket 66 will rotate in unison when belt 62 is tightened. A chain 67 encircles sprocket 66 and sprocket 51, which is mounted on shaft 50 with sprockets 49 (FIG. 18). Thus whenever clutch handle 58 is manipulated in the foregoing manner, the drive from motor 52 will cause chains 48 to be driven. It is to be noted that a detent member 68 mounted on upright frame member 20 and that handle 58 may be moved under detent 68 to permit the conveyor chains 48 to move continuously. Whenever it is desired to stop movement of chains 48 it is merely necessary to move the outer end of handle 58 outwardly away from upright 20 and release it and this will cause spring 69 which has one end thereof affixed to clutch handle 58 and the other end thereof mounted on a suitable portion of the conveyor bed to cause the clutch handle 58 to pivot in a counterclockwise direction about pin 61, thereby removing the force of clutch shoe 59 from shaft 56. This will cause belt 62 to loosen to thereby cease to transmit the drive from motor 52 to sprockets 49 which drive chains 48.

Figure 2:
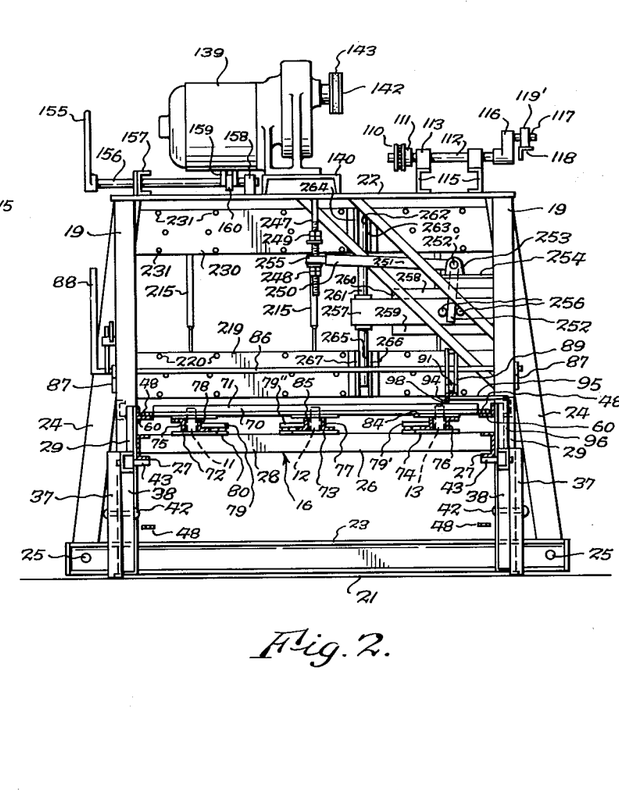
FIG. 2 is an end elevational view of the machine of FIG. 1 taken substantially along line 2—2 of FIG. 1.

As noted above, pin 61 which mounts clutch handle 58, is mounted on one of the two frame members 60 (FIG. 2). Frame members 60 are secured, as by welding, to guide members 29 so that frame members 27 of bed 26 and frame members 60 will move in unison whenever the height of bed 26 is adjusted in the above described manner. Frame members 60, as can be seen from FIG. 2, are essentially angle irons. The horizontal legs (not numbered) of members 60 actually provide a guide or support for the upper run of chains 48. It is also to be noted that angle irons 60, as well as longitudinal frame members 27 (FIG. 2), are in contiguous relationship with the facing surfaces of upright frame members 19 and 20. Because of the manner in which guides 29, frame members 27 and angle members 60 are integrated relative to uprights 19 and 20 a good, stabilized, arrangement is provided between the conveyor 16 and the uprights 19 and 20.

From FIG. 4 it can be seen that angle irons 70 are affixed to spaced chains 48 at predetermined spaced locations longitudinally of said chains. The ends of angle irons 70 rest on and are guided by the horizontal legs of angle irons 60, described above. The upstanding legs 71 of angle irons 70 are adapted to abut the ends of stringers 11, 12, and 13 of pallet 10 to thereby move said stringers from right to left in FIG. 4, in a manner which will become more apparent hereafter. From FIGS. 2 and 4 it can be seen that bed plates 72, 73, and 74 are rigidly secured, as by welding, to the upper surfaces of members 28 of bed 26. Bed plates 72, 73, and 74 extend substantially throughout the length of conveyor 16. Secured to bed plate 72 is an angle iron 75, which acts as a guide for stringer 11 because it is rigidly secured to plate 72. Rigidly secured to plate 74 is angle iron 76 and rigidly secured to plate 73 is angle iron 77. Since angle irons 75 and 76 extend substantially throughout the length of conveyor 16 and since they are rigidly fixed to plates 72 and 74, respectively, they determine the spacing of the outer sides of stringers 11 and 13. From FIG. 2 it can be seen that the height of stringer 11 is greater than the height of angle iron 75. In other words, stringer 11, when seated firmly on bed 72 extends above the upper portion of angle iron 75. Thus leg 71 of angle iron 70 can engage the upper portion of stringer 11 to move it longitudinally on bed plate 72 in unison with the movement of chains 48. Stringers 12 and 13 possess a similar relationship with respect to angle iron 70 and the angle irons with which they are associated on bed plates 73 and 74, respectively.

An angle iron 78 (FIGS. 2 and 4) is spring biased toward angle 75. In the foregoing respect, an arm or link 79 (FIG. 4) has one end thereof pivotally secured to bed plate 72 at 80 and the other end thereof pivotally secured to the horizontal leg of angle iron 78 at 81. Another link like 79 is spacedly mounted longitudinally of bed plate 72 and is also affixed between angle iron 78 and bed plate 72, in a similar manner to thereby provide a parallelogram type of linkage. A spring 82 extends between a fixed position 83 on bed plate 72 and is secured to the upstanding leg of angle iron 78. It will readily be seen that as spring 82 tends to contract it will cause angle iron 78 to move toward angle iron 75 because links 79 will tend to pivot in a counterclockwise direction about pivots such as 80 in FIG. 4. Thus angle iron 78 tends to provide a floating type of action to firmly support stringer 11 which is held between the vertical legs of angle irons 75 and 78 (FIG. 2). A pair of links 79′ (FIG. 4), only one of which is shown, is associated with movable angle iron 84 mounted on bed plate 74 (FIGS. 2 and 4). A spring 82′ is operatively associated with movable angle iron 84 in the same manner as spring 82 is associated with movable angle iron 78. The action of spring 82′ will tend to bias angle iron 84 upwardly in FIG. 4 to thereby tend to securely retain stringer 13 between it and stationary angle iron 76. A movable angle iron 85 is mounted on bed plate 73 by means of a pair of links 79″, only one of which is shown, which are analogous to links 79 and 79′ described above. A spring 82″ tends to bias movable angle iron 85 upwardly in FIG. 4 to thereby provide a floating action to grip stringer 12 which is located between angle irons 77 and 85. The reason for providing the above-described floating action of the guide angle irons for the stringers is to permit them to automatically adjust to compensate for variations in dimensions of said stringers. In the foregoing respect it will be appreciated that pallets are fabricated from rough lumber, which may vary as much as ¼ to ⅜ of an inch in width. Because the outer angle irons 76 and 75 are fixed they will determine the overall width of the pallet. However, if the stringers do vary in width, the movable angles can automatically compensate for such variations while rigidly and firmly supporting said stringers for longitudinal movement relative to bed plates 72, 73, and 74 as a pallet is fed to the nailing portion of the improved pallet making machine.

In order to operate the conveyor portion of the present machine in a semi-automatic manner, the following steps are performed. First of all, stringers 11, 12, and 13 are located between the angle iron guides associated therewith as shown in FIG. 2 and FIG. 4 with the lower surfaces of the stringers resting on bed plates 72, 73, and 74. Thereafter slats 14 are laid across stringers 11, 12, and 13 in the manner shown in FIG. 4. In the foregoing respect it is to be noted from FIG. 4 that the right ends of the stringers are brought up into abutting engagement with edge 71 of one of the angle irons 70 which extends between chains 48. After slats 14 have been placed in approximately their proper position it is necessary to align them. This is effected by the following mechanism which includes rod 86 (FIGS. 1 and 2) which is journaled in plates 87 secured to uprights 19 of the frame 18. A handle 88 is provided at the end of rod 86. Rod 86 has a lever 89 (FIG. 2) rigidly secured thereto. The upper end of lever 89 is affixed to one end of spring 90 (FIG. 1), the other end of which is suitably secured to a portion of frame 18, to thereby bias lever 89, shaft 86 and handle 88 in a counterclockwise direction in FIG. 1 about the connections between shaft 86 and plates 87. The bottom end of lever 89 is pivotally secured to an end of link 91 (FIG. 1) the other end of which is pivotally secured to uprights 92 (FIGS. 1 and 4) by pin 93. Uprights 92 are in turn rigidly secured, as by welding, to aligning guide 94 which is essentially an angle iron as can be seen from FIG. 2. Aligning guide 94 in turn is mounted for movement in parallelism relative to the guides for the stringers. More specifically parallelogram type of links 95 of first ends thereof pivotally secured at 96 to frame members 27 of bed 26. The other ends of links 95 are pivotally secured to aligning guide 94 at 97. It can readily be seen therefore that whenever handle 88 is pivoted in a clockwise direction about the axis of rod 86 and against the bias of spring 90, lever 89 will also pivot in a clockwise direction (FIG. 1) so that link 91 will move from right to left in FIG. 1. As link 91 moves from right to left in FIG. 1, aligning guide 94 will also move from right to left in FIG. 2 or downwardly in FIG. 4. However, its position relative to the guides for the stringers is controlled by the parallelogram type of link 95. Thus as aligning guide 94 moves from right to left it will also move downwardly in FIG. 4 while maintaining its parallelism with the angle iron guides which guide the stringers. Thus the inner surface 98 of guide 94, when moving downwardly in FIG. 4, will abut the ends of slats 14 to thereby align said ends. The foregoing movement of aligning guide 94 is permitted because as handle 88 is rotated in a clockwise direction, as described above, rod 86 will be permitted to move from right to left through its supporting plates 87 in FIG. 2. After an alignment has been effected in the foregoing manner, handle 88 is released, whereby spring 90 will cause it to pivot in a counterclockwise direction in FIG. 1 to thereby return guide 94 to an out of the way position wherein it is no longer in abutting relationship with the ends of slats 14. Aligning guide 94 also has an additional function. By positioning handle 88 in any desired location, the position of the edge 98 of aligning guide 94 will be determined. In other words, the position of aligning guide 94 may be calculated to be a certain distance from the center of the stringer 13 and thus the aligning guide may be used for the making of "wing pallets" wherein the ends of slats 14, instead of being flush with the outer surfaces of stringers 11 and 13, will hang over said outer surfaces of said stringers.

After the stringers and slats have been assembled and aligned in the above-described manner on the right end of conveyor 16, it is merely necessary to manipulate clutch handle 58 to cause the motor which drives chains 48 to move the assembled and aligned pallets from right to left in FIG. 1. The clutch 58 is caused to remain in engagement until such time as a portion of the assembled pallets and stringers is moved to a position underneath the nailing heads 194 of the machine, at which time nailing is commenced, in the manner which will be described in detail hereafter.

The delivery of single nails to the nailing heads, which will be described in detail hereafter, is effected in a completely automatic manner. Three hoppers 99 are provided on the machine. Each hopper 99 (FIG. 7) includes a bottom wall 100, side walls 101 and end walls 102 and 103. Nails are manually dumped into said hoppers in a random manner. By the agitation of the hoppers, the nails 202 are caused to align themselves in the manner shown in FIG. 1. More specifically, hoppers 99 have plates 104 and 105 therein (FIG. 7). The bottom wall 100 of hopper 99 has a slot 106 therein so that the agitation of the hoppers from the dotted line position to the solid line position in FIG. 6 and back again causes the shanks of the nails 202 to be guided by plates 104 and 105 through slots 106 wherein they remain suspended by their heads until they are removed therefrom. The agitation of hoppers 99 is effected in the following manner. A motor 107 (FIG. 5) is mounted on platform 22 on the top of frame 18. A gear reducer 108 is suitably coupled to motor 107 and drives sprocket 109 which in turn causes chain 110 to drive sprocket 111 mounted at the end of shaft 112 which is journaled in bearings 113 and 114 supported above platform 22 by pedestals 115. The end of shaft 112 remote from sprocket 111 carries a crankarm 116. A pin 117 is mounted on the end of crankarm 116 and said pin is pivotally secured to elongated link 118 by bearing 119'. From FIG. 5 it can be seen that the end of link 118 remote from pin 117 is pivotally secured to one end of crankarm 119 (FIG. 6) which is mounted on the end of shaft 120 which in turn is journaled in spaced bearings 121 (FIG. 12) on platform 22. A plurality of crankarms 122 are spacedly keyed on shaft 120. Each crankarm 122 has pivotally mounted on the outer end thereof a link 123 which has the other end thereof pivotally mounted between flanges 124 (FIG. 7) on the bottom of each hopper 99. The front sides 102 of hoppers 99 have an angle iron 125 extending across them so as to rigidly secure each of the hoppers 99 to each other. A tube 126 (FIG. 6 and 1) is welded to angle iron 125 to lend rigidity thereto. Plates 126' (FIG. 5) are welded to the opposite ends of angle iron 125 and to the opposite ends of a plate 127 which extends across the top edges of each of the hoppers and is suitably welded thereto (see FIGS. 1 and 5). Pivot shafts 128 extend from plates 126' and are suitably journaled in bearings 129 which are mounted on pedestals 130 (FIG. 6). It will be appreciated that whenever motor 107 is placed in operation, the rotation of crank 116 will cause oscillation of elongated link 118 to therefore cause hoppers 99 to move between their solid and dotted line positions in FIG. 6 about the center of the pivot shafts 128. The agitation of hoppers 99 in the foregoing manner will cause the nails contained therein to eventually assume a position wherein the shanks thereof extend through slots 106 with their heads lying above slots 106 (FIG. 7). It will be noted at this point that a plate 131 (FIG. 7) is movably mounted on the horizontal leg 132 of angle iron 133 mounted on hopper 99. Nuts and bolts 134 are used to permit selective movement of plates 131 to vary the size of slot 106 to thereby adjust the hoppers for receiving different sized nails.

The ends of slots 106 of hoppers 99 are open to permit nails which have aligned themselves within slots 106 to pass into guide 134 (FIGS. 5, 6, and 9) associated with each of the hoppers 99. Each of guides 134 have a slot 135 therein (FIG. 9) which is in alignment with slots 106 of hoppers 99. The center of rotation of shafts 128, about which hoppers 99 pivot, coincide with the open ends of slots 106 in the hoppers so that when hoppers 99 are in their solid line position in FIG. 6, the nails which have aligned themselves within slots 106 will pass into slots 135 of guides 134. Each of guides 134, consisting of plates 136 (FIG. 9) with slot 135 therebetween, is mounted in the following manner. Channel shaped sections 137 (FIGS. 8 and 9) are spacedly welded to angle iron 138 (FIG. 6) which has the opposite ends thereof suitably secured, as by welding, to the inside surfaces of pedestals 130. It will be noted that whenever it is desired to change the dimension of slot 135 it is merely necessary to manipulate the adjusting screws which extend through plates 136, and by loosening and tightening these screws before and after the adjustment, respectively, a suitable dimension can be imparted to slots 135 to permit them to receive nails having different sized shanks. Because of the above-described oscillatory movement of hoppers 99 and because of the orientation of nail guides 134 relative thereto the nails which have been aligned within slots 106 of hoppers 99 will be transferred into slots 135 of guides 134 and will remain there until such time as they are removed therefrom, one at a time, by the improved nail picker of the present invention, which will be described at a suitable portion of the specification hereafter.

In order to actuate the improved nailing mechanism of the present invention, the following structure is provided. A motor 139 (FIGS. 1 and 5) is mounted on pedestal 140 which is secured to platform 22. A gear reducer 141 is associated with motor 139 and drives pulley 142 which in turn drives belt 143 mounted on pulley 144 which in turn is mounted on shaft 145 journaled in bearings 146 which are in turn mounted on pedestals 147 secured to platform 22. The end of shaft 145 remote from pulley 144 mounts sprocket 148 which in turn drives chain 149 which encircles sprocket 150, which is operatively associated with a single revolution clutch 151. Motor 139 may thus rotate at all times until clutch 151 is actuated and when the latter is actuated it will cause main shaft 152 to rotate for one revolution and then stop after clutch 151 automatically disengages. The opposite ends of shaft 152 (FIGS. 5 and 14) are journaled in bearings 153 mounted on supporting blocks 154 and 154' which are located on platform 22.

In order to actuate clutch 151 to provide a single rotation of shaft 152, it is merely necessary to pull handle 155 in a counterclockwise direction in FIG. 1 to thereby cause counterclockwise rotation of shaft 156 which is journaled in bearings 157 and 158 on platform 22. A crankarm 159 is mounted on shaft 156 and in turn is pivotally connected to link 160 which in turn is pivotally connected to yoke 161 of clutch 151. After handle 155 is released, clutch 151 will continue in operation until one complete revolution of shaft 152 is obtained and thereafter clutch 151 will disengage so that shaft 152 will remain in its position one revolution removed from the position in which it was when its movement was initiated.

The improved nail picker of the present invention is actuated by the rotation of main shaft 152 in the following manner. A dog 162 (FIGS. 5 and 11) is keyed to shaft 152. When shaft 152 is caused to rotate for its single revolution, dog 162 will rotate in a counterclockwise direction in FIG. 11. A star wheel 163 (FIG. 11) is keyed to shaft 164 which in turn is journaled for rotation in bearings 165 mounted on platform 22. Dog 162 and star wheel 163 essentially comprise a modified type of Geneva movement. Since star wheel 163 has five points thereon, for every revolution of shaft 152, shaft 164 will experience one-fifth of a revolution. A gear 166 is keyed to shaft 164 and is in mesh with pinion 167 (FIGS. 5 and 6) which in turn is keyed to shaft 168 which is journaled for rotation in bearings 169, 170, and 171 mounted on platform 22. A brake 172 of the friction type is also mounted on platform 22 and engages shaft 168 so that when star wheel 163 is not positively driven shaft 168 will stop in the position to which it was last moved by the above-described gears 166 and 167 deriving their movement from star wheel 163. An eccentric 173 (FIGS. 5 and 12) is mounted on shaft 168 and a yoke 174 encircles eccentric 173. An arm 175 extends from yoke 174 and has a ball joint 176 located at the outer end thereof. Leading from ball joint 176 is an arm 177 (FIGS. 5 and 12) which is keyed to shaft 178 (FIGS. 5 and 12) which in turn is journaled in bearing 179 affixed to platform 22. The upper end of shaft 178 mounts pinion 180 which is in mesh with rack 181 which is secured to slide 182. Slide 182 in turn is adapted to reciprocate back and forth in the direction of the arrows in FIG. 5 in timed relationship to the operation of dog 162 and star wheel 163. To guide the foregoing reciprocation, slide 182 is mounted in bearings 183, 184 and 185 (FIG. 5) which are secured to frame member 186 mounted on platform 22. (See also FIG. 9.)

Figure 5:
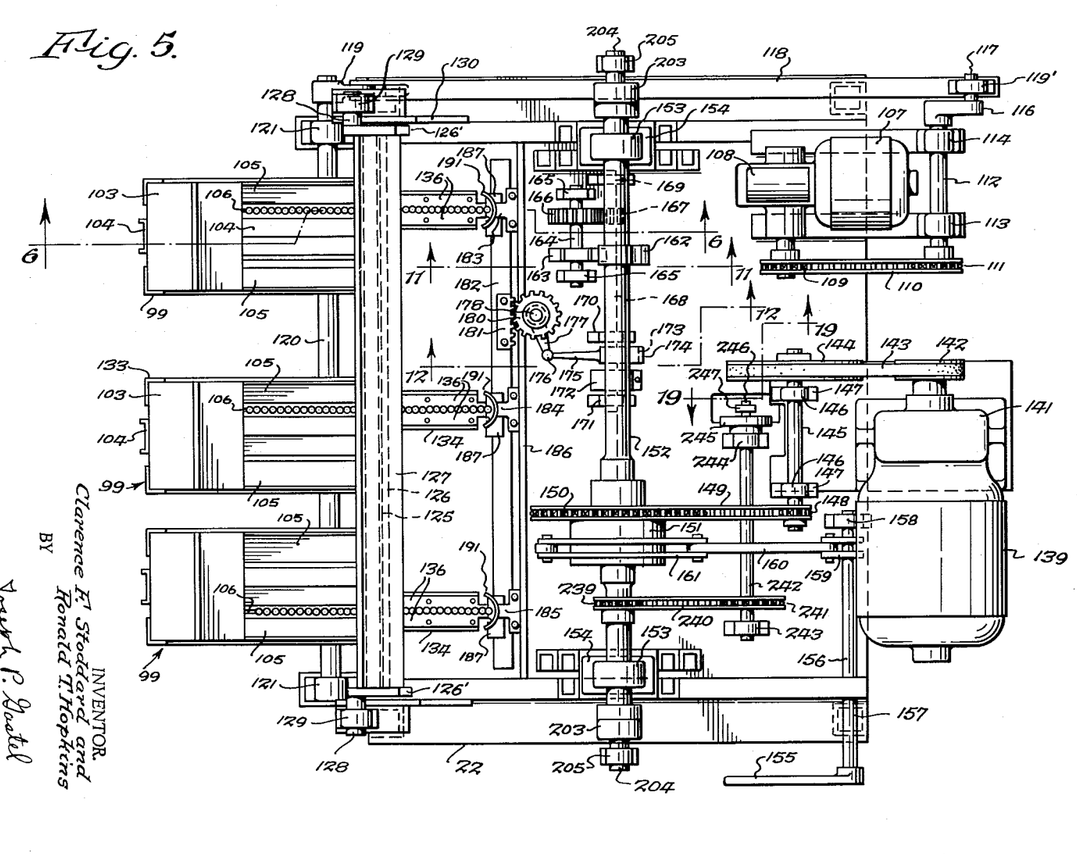
FIG. 5 is a plan view of the top of the nailing machine showing the various mechanical drives and linkages which are mounted on a platform above the conveyor.
Figures 6, 7, 8, 9, 10, 11, 12:
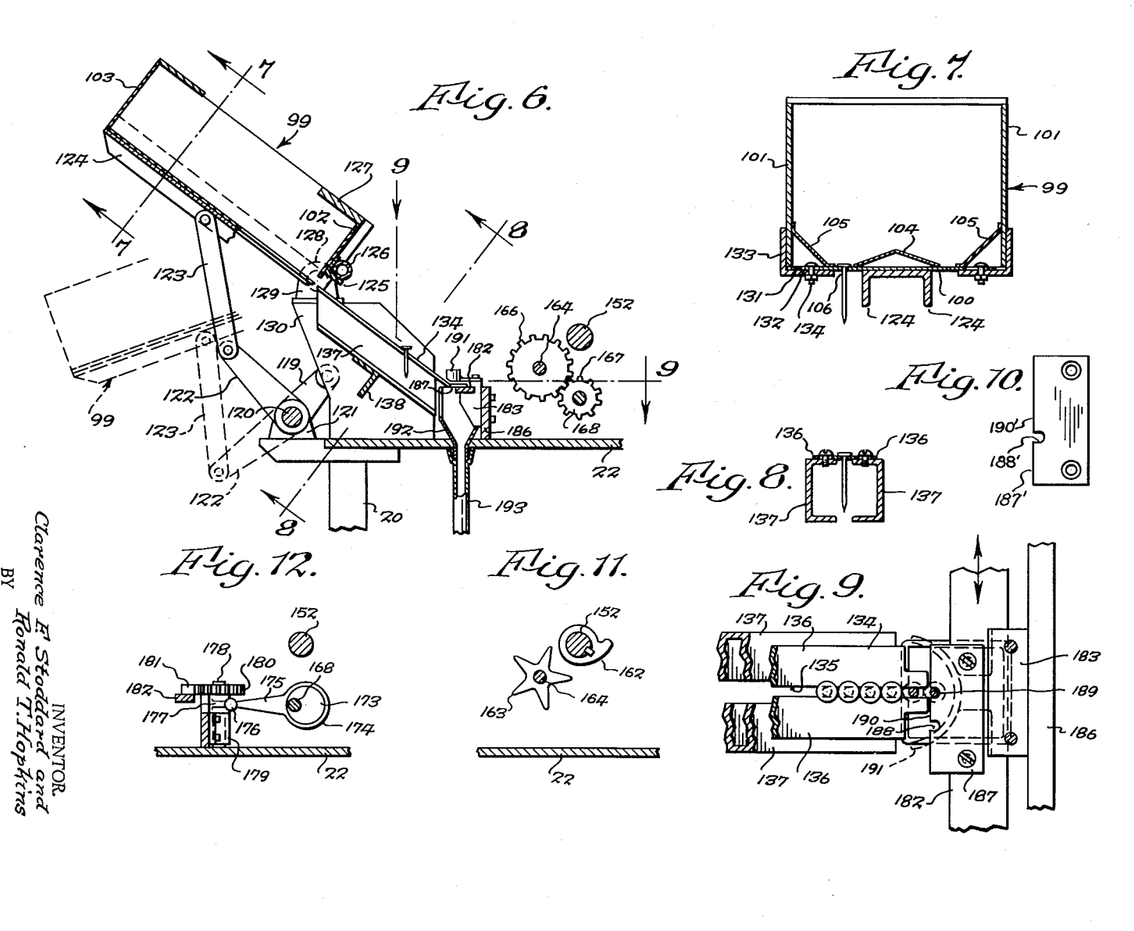
FIG. 6 is a view taken substantially along line 6—6 of FIG. 5 and showing the orientation between the nail hopper and the nail picker of the nailing mechanism.
FIG. 7 is a view of the inside of the hopper of FIG. 6 taken substantially along line 7—7 of FIG. 6.
FIG. 8 is a view of the guide leading from the nail hopper to the nail picker and is taken substantially along line 8—8 of FIG. 6.
FIG. 9 is a plan detail view of the improved nail picker of the present invention taken substantially along line 9—9 of FIG. 6 with certain parts omitted in the interest of clarity.
FIG. 10 is a detail view of a modified form of slide plate which can be used with the improved nail picker of the present invention.
FIG. 11 is a view taken along line 11—11 of FIG. 5 and showing the linkage which is utilized for causing the nail pickers to selectively take only a single nail from the chutes associated therewith in timed relationship to the operation of the nailing mechanism.
FIG. 12 is a view taken substantially along line 12—12 of FIG. 5 and showing another portion of the linkage which is utilized for actuating the nail picker of the present invention.

Mounted at spaced locations on slide 182 are nail picker plates 187 (FIGS. 5 and 9). Plates 187 have grooves 188 and 189 spaced thereon. The arrangement of the above-described linkage is such that eccentric 173 on shaft 168 will cause arm 177 to move from one limit of its movement in one direction to its opposite limit of movement in the opposite direction in an oscillatory manner every time that dog 162 actuates star wheel 163. This oscillation will cause slide 182 to move back and forth so that either one of slots 188 or 189 are in alignment with slot 135 of nail guide 134. In other words, assuming that slot 189 is in alignment with slot 135 (FIG. 9), due to the incline of nail guide 134 (FIG. 6), the end nail will move from slot 135 into slot 189. Thereafter the above-described linkage will cause nail picker plate 187 to move upwardly in FIG. 9 and carry the nail with it which is held within slot 189. However it will be noted that there is a straight surface 190 between slots 189 and 188. This straight surface, during the upward travel of slot 189, will prevent the nail adjacent to the nail held in slot 189 from moving out of slot 135. It is only after movement of nail picker plate 187 in a vertical direction is completed that slot 188 will move into alignment with slot 135 and thereby permit the next nail to fall into slot 188. It is to be noted that slot 189, during its upward movement in FIG. 9, will carry the nail contained therein until such time as the head thereof engages circular stationary cam 191 which will cause the nail to move to the left in FIG. 9 and thereby be dislodged from slot 189. As can be seen from FIG. 6, a funnel 192 is located under cam plate 191 so that the nail which is dislodged from slot 189 will drop into funnel 192 and thereafter pass, in an upright orientation, with its head above its shank, into chute 193 leading to one of the nailing heads 194, which will be described in detail hereafter. It will be noted that because of the action of slide 182 upon which nail picker plates 187 are mounted, three nails are simultaneously received from nail guides 134 and dropped into the three chutes leading to the nailing heads 194. As noted above only one nail at a time can be removed from nail guides 134 because of the action of the nail picker plates 187. Furthermore it will be noted that because there are two spaced slots 188 and 189 in nail picker plates 187, while a first nail is being dropped into funnel 192 a second nail is being received in the other of the slots in the nail picker plate so that when the nail picker plate is reciprocated in the opposite direction as a result of the downward movement (in FIG. 9) of guide 182 the nail which was received in slot 188 will be dropped into funnel 192 when the head of said nail engages cam 191. During the dropping of the nail from slot 188 the next successive nail is received in slot 189 whereupon the above-described sequence of events is repeated. In summary in the foregoing respect it will be seen that nail picker plates have a movement which is the distance between the slots 188 and 189 so that a nail which received in one of said slots is discharged while the other of said slots is being loaded. Because of the action of brake 172, described above, the nail picker plates 187 will always stop with one of the slots thereof in alignment with the end of slot 135 of nail guide 134. The sequence of operation of the above-described nail picker plates with respect to the operation of the remainder of the nailing mechanism will be described hereafter at a suitable portion of the specification.

After the nail passes down chute 193 and through chute extension 193' mounted on nailing head 194, it passes between guides 195 mounted on plate 195' and into jaws 196 which are mounted at the ends of arms 197 which are pivotally secured on plate 195' by pins 198. Springs 199 are secured to guides 195 by screws 200 and bear on surfaces 201 of arms 197 to thereby bias arms 197 and jaws 196 toward each other. Nail 202, which is guided to jaws 196 by guides 195, is held within jaws 196 in substantially the position shown in FIG. 16 until such time as it is driven through an assembled slot and stringer in a manner to be described hereafter. The manner in which nailing heads 194', which include nailing head chucks 194 and nail drivers 215, are mounted on the machine will also be described hereafter.

The mechanism which drives the nails into the assembled slots and stringers is as follows. From FIGS. 5, 13, and 14 it can be seen that crankarms 203 are mounted at the ends of main driveshaft 152 and that from the preceding description it will be understood that shaft 152 will rotate from a position wherein crankarms 203 will move from a top dead center position for one revolution and terminate at a position which is substantially top dead center because of the action of single revolution clutch 151. Pins 204 extend from the outer ends of crankarms 203 and are received in suitable bearings at the upper ends of links 205. The lower ends of links 205 journal pins 206 which extend from arms 207 depending from I beam 208 (FIGS. 14 and 15), the end portions of which are mounted in suitable bearing blocks 209 which ride in the ways 210 between frame members 211 and 212, a pair of each being on opposite sides of the machine. In this respect it is to be noted that frame members 211 and 212 have their upper ends welded to platform 22 and their lower ends welded to frame members 213 which extend between uprights 19 and 20. It will be noted from FIGS. 1 and 14 that plates 214 are mounted at the ends of I beam 208 to prevent movement of said I beam in the direction of its longitudinal axis while permitting said I beam to move in a vertical direction in FIG. 14. In view of the foregoing structure it can be seen that as a result of a single rotation of cranks 203 mounted on shaft 152 I beam 208 will move down and then move up and stop. The ends of I beam 218, which supports nailing head chucks 194, are also mounted in bearings 209' which are located between frame members 211 and 212 so that the bearings may move vertically in ways 210 of the frame. Plates 221 are suitably secured to the bearings 209' mounted on the ends of I beam 218 so as to prevent said I beam from moving in the direction of its longitudinal axis and therefore restricting the I beam to movement only in a vertical direction.

Tie rods 222 (FIGS. 13, 14, and 15) have headed portions 223 which support the bearing blocks on which lower I beam 218 are mounted. Tie rods 222 extend upwardly through the bearing blocks in which upper I beam 208 is supported. Nuts 224 are threaded on the ends of tie rods 222. Tie rods can move relative to both sets of bearings 209 and 209' in which I beams 208 and 218 are mounted, so that actually I beam 218 is suspended from I beam 208 and may move relative thereto, as required, in a manner to be described hereafter.

Figure 13:
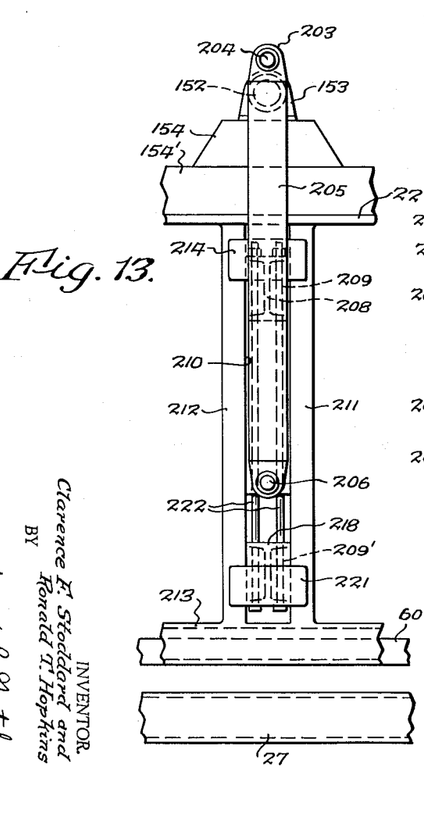
FIG. 13 is a view of the drive between the main driveshaft of the nailing machine and the nailing heads, this view being taken substantially along line 13—13 of FIG. 14.
Figure 14:
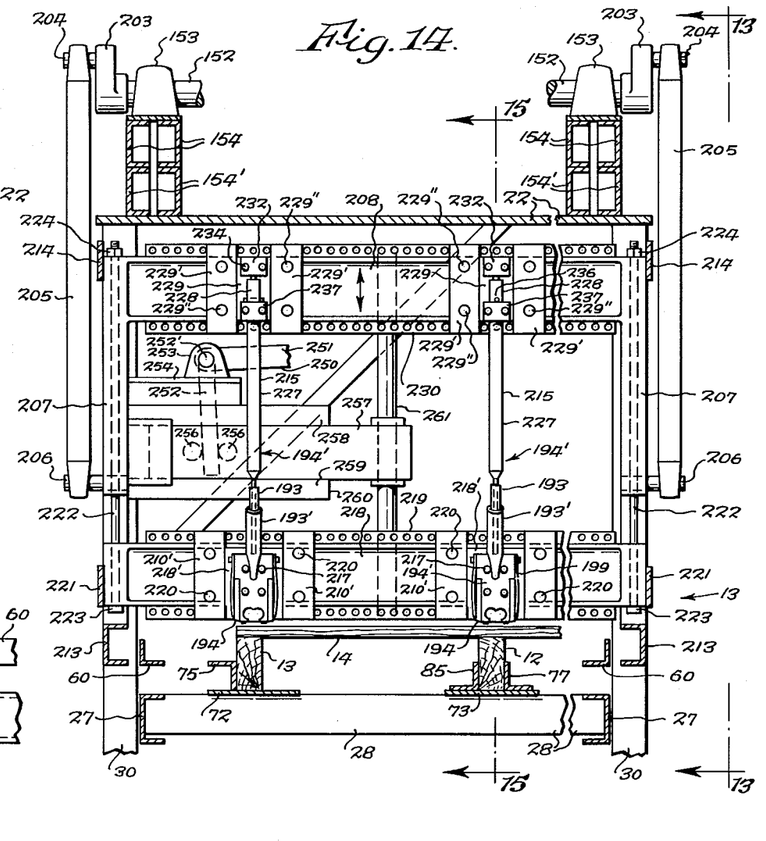
FIG. 14 is a view of the portion of the pallet making machine taken substantially along line 14—14 of FIG. 1 and showing in detail various portions of the nailing heads and related structure, certain parts of the machine having been omitted in the interest of clarity.

Once cranks 203 are actuated from their top dead center positions to drive links 205 downwardly to cause the nailing operation to commence, I beams 208 and 218 will move in unison until such time as spurs 225 on each of nailing head chucks 194 engage slat 14 which is lying across stringers 11, 12, and 13. Thereafter continued downward movement of I beam 208 will not be accompanied by an accompanying downward movement of I beam 218 because the latter has already engaged slat 14. By permitting the lost motion between I beams 208 and 218 because of the manner in which tie rods 222 are connected thereto, I beam 208 may continue its downward movement after the nailing heads chucks 194 on I beam 218 have engaged slat 14. Spurs 225 engage slat 14 in the vicinity in which the nail is being driven to prevent slat 14 from rotating as the nails 202, which have spiral threads thereon, are driven into the assembled slat and stringers.

Figure 15:
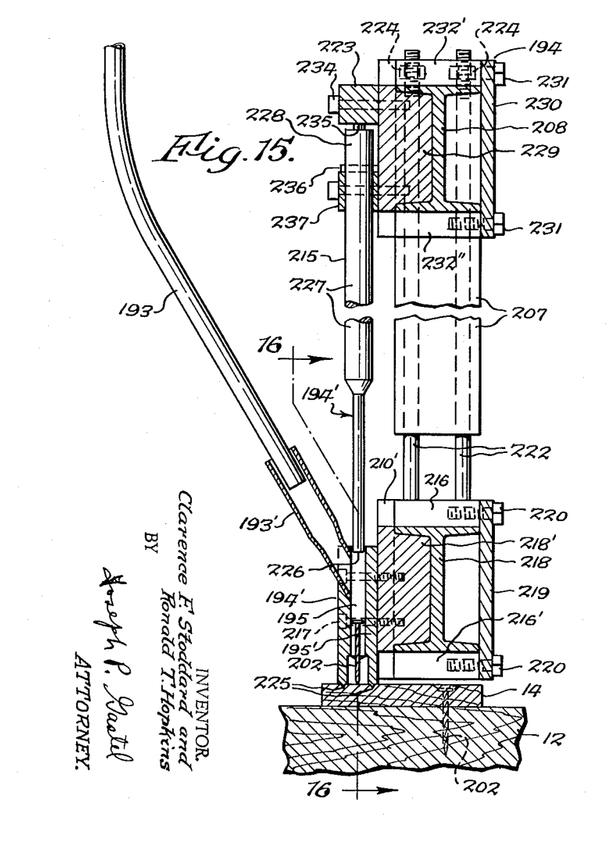
FIG. 15 is a view taken along line 15—15 of FIG. 14 and showing in detail the structure of the nailing heads.
Figure 16:
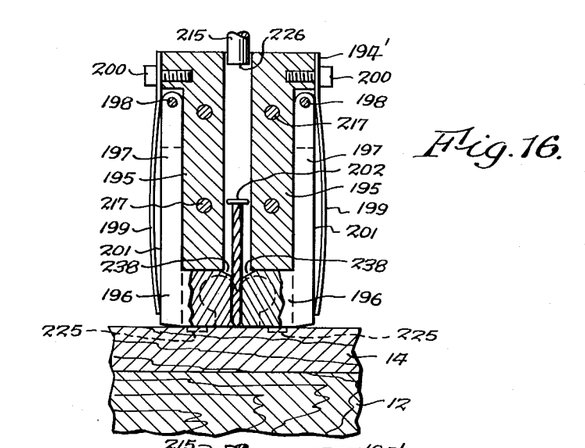
FIG. 16 is a view taken along line 16—16 of FIG. 15 and showing the relationship between the nail driver and the construction in the nailing head for holding a nail in position ready to be driven.
Figure 17:
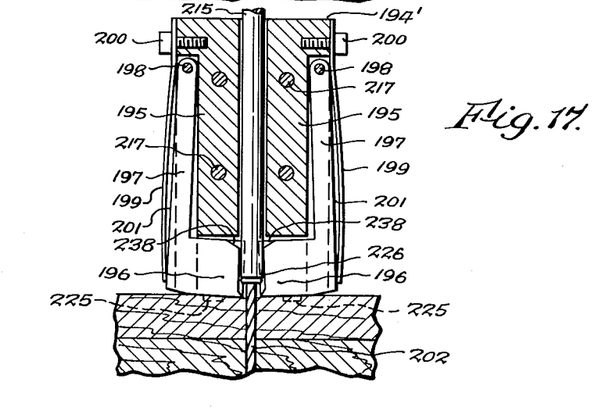
FIG. 17 is a view similar to FIG. 16 but showing the position which the construction for holding the nail assumes during the nail driving operation.

As I beam 208 continues its downward movement under the action of cranks 203 and links 205 a point will be reached wherein the ends 226 of drivers 215 of nailing heads 194' engage the heads of nails 202 and cause them to move from the position shown in FIG. 16 to the position shown in FIG. 15, the intermediate position of said nails being shown in FIG. 17. At this point it is to be noted that the drivers 215 have a central portion 227 and a top portion 228 in addition to the above-mentioned end portion 226 which engages the nails to be driven. The central and upper portions 227 and 228, respectively, are preferably of a mild steel which will bend rather than rupture in the event that the machine becomes jammed for some reason or other. The ends 226 however are preferably hardened so as to prevent wear as a result of engaging the heads of the nails. The reduced upper portions 235 of drivers 215 may also be hardened so as to prevent wear when they operate in the manner which is to be described hereafter. At this point it is to be noted that bearing blocks 229 are mounted on I beam 208 by plates 229' and screws 229''. Bearing blocks 229 which may be of any suitable construction are fastened to I beam 208 and adapted to move along the longitudinal axis of I beam 208 in the manner to be described hereafter. However, insofar as the present construction is concerned, for driving the nails it is to be noted that blocks 232 are secured to the faces of bearing blocks 229 by screws 234. These blocks are preferably hardened and engage the reduced upper portions 235 of drivers 215. The upper portions 228 of drivers 215 have pins 236 extending therethrough to prevent said drivers 215 from dropping from the bearing blocks 229 on which they are mounted because a collar 237 of less diameter than the length of pins 236 is fastened about the upper portion 228 of each driver 215 by suitable screws. Collar 237 holds driver 215 in position and is lined with a bearing surface to permit drivers 215 to rotate as nails 202 are driven into the workpiece. It is also to be noted that bearing block 232 and head 235 are hardened so that they provide a good bearing surface which permits drivers 215 to rotate during the driving of nails 202.

As a result of the downward movement of I beam 208 in the above-described manner, each driver 215 is caused to move downwardly between the sides 195 of each nailing head chuck 194 until it engages the head of nail 202 in FIG. 16. Thereafter the drivers 215 and the nails 202 will move together until such time as the heads of the nails engage the inclined surfaces 238 (FIG. 17) of jaws 196 and force them to spread outwardly, as shown in FIG. 17, against the bias of springs 199. It will be noted that the jaws 196 guide the nail during the initial portion of its travel through the workpiece and the sides 195 guide the head of the nail. The throw of cranks 203 in such as to cause the ends 226 of drivers 215 to cause the nails 202 to enter the slats and be countersunk therein so that there will be no protrusion of the nails about the upper surface of the slats.

In accordance with the present invention, an arrangement is provided for causing the nailing head chucks 194 and the drivers 215 to shift laterally relative to the longitudinal axis of the conveyor after each nail has been driven in the above-described manner, to thereby prevent subsequently driven nails from entering the stringers in alignment with previously driven nails. That is, it is desired that adjacent nails be staggered so that the cracking of the stringers is prevented. Nailing head chucks 194 can shift laterally in unison on I beam 218. To this end, nailing head chucks 194 are secured to bearing block 218' by screws 217 (FIG. 14). Plates 210' are secured to bearing block 218' by screws 220. Plates 210' have bearing block portions 216 and 216' affixed thereto and extending rearwardly therefrom (FIG. 15) which are adapted to engage the upper and lower lateral portions of I beam 218, respectively. Screws 220 extend through plate 219 (FIGS. 15 and 2) to retain plates 210' and bearing blocks 216 and 216' in the desired position on I beam 218. Bearing blocks 216, 216' and 218' slide relative to I beam 218 in a manner to be described hereafter. As can be seen from FIG. 2, plate 219 has a length which approaches the length of I beam 218, but as can be seen from FIG. 14, plate 219 is shorter than I beam 218. Drivers 215 of nailing heads 194' are mounted for relative sliding movement with respect to I beam 208 (FIGS. 14 and 15) in a manner which is similar to the mounting of nailing head chucks 194. More specifically, bearing block 229 has plates 229' attached thereto by means of screws 229''. Plates 229' have rearwardly extending bearing block portions 232' and 232'' located proximate the upper and lower horizontal surfaces of I beam 208. A plate 230 is affixed to bearing blocks 232' and 232'' by means of screws 231 (FIGS. 15 and 2). Bearing blocks 229, 232' and 232'' permit selective movement of drivers 15 in a lateral direction relative to I beam 208 in a manner to be described hereafter. It is to be noted from FIG. 2 that plate 230 extends substantially the entire length of I beam 208, but as can be seen from FIG. 14 plate 230 is shorter than I beam 208.

Figure 19:
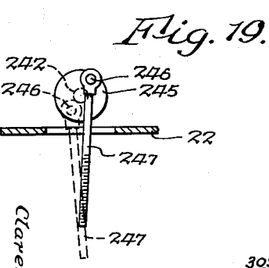
FIG. 19 is a view of a portion of the nail head shifting mechanism taken substantially along line 19—19 of FIG. 5.

The following structure is provided for shifting each of the nailing head chucks 194 and drivers 215 laterally in unison after each nailing operation. On main drive shaft 152 is a sprocket 239 (FIGS. 1 and 5) which drives chain 240 which in turn drives sprocket 241 mounted on shaft 242. Bearings 243 and 244, mounted on platform 22, journal shaft 242 for rotation. An eccentric consisting of plate 245 and pin 246 is mounted on shaft 242 (FIGS. 5 and 19). Link 247 (FIGS. 2 and 19) has the upper end thereof pivotally mounted on pin 246 of the eccentric. Link 247 is threaded and has lower movable nut 248 and upper movable nut 249 mounted thereon in spaced apart relationship. By the adjustment of the spacing of the nuts on link 247 the amount which the nails will be staggered can be set. A bellcrank lever 250 having a horizontal arm 251 and a vertical arm 252 is mounted on shaft 252' which is journaled in bearings 253 mounted on plate 254 secured to the frame of the machine. The gearing described above which drives the eccentric which drives link 247 is such as to cause pin 246 to move 180° in response to a complete 360° rotation of main driveshaft 152. Thus pin 246 will move from a position proximate bottom dead center to a position proximate top dead center and then stop. Also when the clutch 151 is actuated to cause the main driveshaft 152 to rotate another complete revolution pin 246 will move from a position proximate top dead center to a position proximate bottom dead center, after having traversed 180°, and then stop. Arm 251 of bellcrank lever 250 has a loop 255 formed at the end thereof which encircles link 247 with a large amount of clearance so that the link may pass freely therethrough except when either nuts 249 or 248 engage loop 255.

Assuming that crank pin 246 moves from a position proximate top dead center to a position proximate bottom dead center, there will be a corresponding movement of link 247 downwardly from the position shown in FIG. 2 until such time as nut 249 engages loop 255 and causes bellcrank lever 250 to pivot in a counterclockwise direction about shaft 252'. This will cause a corresponding counterclockwise pivotal movement of leg 252 of bellcrank lever 250. Leg 252 is mounted between lugs 256 (FIGS. 2 and 14) which protrude from slide 257 which is mounted between edge portions 258 and 259 of guide 260, which in turn is suitably secured as by welding to the frame of the machine. Slide 257 in turn carries rod 261 which has an upper portion 262 mounted between plates 263 and 264 which in turn are welded to plate 230 on the rear of I beam 208. The lower end 265 of rod 261 is located between plates 266 and 267 which are secured to plate 219 on the rear of I beam 218. Plates 263, 264, 266, and 267 are essentially angle irons, each having one leg welded to said plates 219 and 230 and the other leg extending at a right angle to plates 219 and 230 to receive the end portions of rod 261 therebetween. It is to be noted at this point that the ends of rod 261 fit between said plates 264, 263, 266, and 267 with a certain amount of clearance so as to permit said plates 219 and 230 to move vertically relative to the ends of rod 261 to permit vertical movement of plates 219 and 230 when I beams 208 and 218 move vertically, as described above.

It is to be noted that there is a certain amount of lost motion between loop 255 and link 247 due to the spacing of nuts 248 and 249 on link 247. More specifically, assume that the machine has been placed in operation so that cranks 203 (FIGS. 13 and 14) cause the nailing heads and drivers to descend in the above-described manner to drive nails through the assembled slats and stringers, as described above. The completing of the driving of the nails will be effected when cranks 203 reach their bottom dead center position and as the cranks 203 move from bottom dead center to top dead center the drivers 215 will be drawn upwardly. The loop 255 at the end of bellcrank lever 250, will not be engaged by nut 249 until after drivers 215 start their upward movement to thereby prevent shifting of the nailing heads and the drivers prior to the time that the nail driving is complete. After drivers 215 start moving upwardly, nut 249 will engage loop 255 and cause bellcrank lever 251 to pivot, as described above, in a counterclockwise direction in FIG. 2. This will cause slide 257 to move to the right and carry rod 261 to the right also. The movement of rod 261 to the right will be accompanied by movement to the right of plates 219 and 230 upon which the drivers 215 and the nailing head chucks 194 are mounted. The movement to the right of plates 219 and 230 will continue until such time as nut 249 has reached its limit of movement as determined by the throw of eccentric 245. It can readily be seen therefore that after a nail has been driven, the drivers 215 and the nailing head chucks 194 will be shifted laterally of the frame of the machine to thereby cause the next nail which is driven by the drivers 215 to enter stringer 11 in staggered relationship relative to the previous nail which was driven.

It is also to be noted at this point that dog 162 (FIGS. 5 and 11) does not engage star wheel 163 until after half of the rotation of main driveshaft 152 has been completed. Tying this in with the operation of the drivers 215 it can be seen that the nail picker plates 187 are not shifted until such time as the drivers 215 are moving upwardly. Thus nails are not delivered to chutes 193 leading to nailing heads 194 until after a previous nailing operation has been completed. This prevents a subsequent nail from being delivered to nailing heads 194 while drivers 215 are passing through nailing head chucks 194 to thereby prevent jamming.

As noted above, since there is a clearance fit between the ends 262 and 265 of rod 261 which causes the shifting of the nailing heads and drivers, plates 219 and 230 can move vertically relative to rod 261 to thereby permit the above-described vertical movement of the drivers and the nailing heads in the manner described above.

The description of link 247 given above described it as moving from a position proximate top dead center to a position proximate bottom dead center and from a position proximate bottom dead center to a position proximate top dead center. Actually as can be seen from FIG. 19, pin 246 of the eccentric stops in a position before it reaches top dead center and also stops in a position before it reaches bottom dead center. This orientation delays movement of bellcrank lever 250 to the last possible moment to thereby insure that the nail driving operation is complete before shifting of the drivers 215 and the nailing head chucks 194 occurs. More specifically, assuming that pin 246 is at the position shown in FIG. 19 when the machine is actuated. Upon actuation of the machine, as drivers 215 start their downward movement as the result of the action of cranks 203 mounted on shaft 152, there will be a slight upward movement of bellcrank lever arm 251. However, this occurs before the drivers engage nails 202 and before the bottom I beam 218 causes the nailing head chucks 194 to engage the slats. In other words, pin 246 moves from the position shown in FIG. 19 to top dead center before the slats are contacted in any manner. Thereafter in moving from top dead center to the position shown in FIG. 19, pin 246 causes link 247 to move downwardly. During the downward movement there is immediate disengagement between loop 255 and nut 248 and there is a lost motion travel between loop 255 and the portion of link 247 between nuts 248 and 249. Nut 249 will not engage loop 255 until a relatively late time after nailing has been completed to thereby insure that there is no lateral movement of the drivers and nailing heads either during the nailing or when spurs 225 are still in engagement with slats 14. Conversely when pin 246 (FIG. 19) moves from the dotted line position of FIG. 19 to the solid line position it has to pass through bottom dead center and this will cause a small oscillation of the nailing head chucks 194 and the drivers 215. But this occurs prior to the time that the slats 14 are engaged by either the nail or by the nailing head chucks. Thus the nailing is effected positively prior to the time that shifting of the nailing heads 194' is effected because the causing of the pin 246 to move through bottom dead center insures that the nailing heads 194', which include both chucks 194 and drivers 215, will not be shifted until the last possible instant.

Summarizing, therefore, it can be seen that with a nail in position in nailing head chucks 194, the actuation of the machine will cause the spurs 225 of nailing head chucks to come down to engage slat 14 and thereafter the drivers 215 will drive the nails through the assembled slats and stringers. After the nailing is complete and the drivers pull away from the driven nails, a point will be reached wherein dog 162 engages star wheel 163 and causes nails to be delivered to the driving heads in the above-described manner. Furthermore as a result of the action for shifting the nailing heads and the drivers, as described above, after nailing is complete there will be a lateral shifting of the drivers and nailing heads to cause the subsequent nails which are to be driven to be staggered in the stringers relative to the previous nails which were driven. All of the foregoing is performed automatically without any requirement for thought on the part of the machine operator. It is to be noted at this point that chutes 193 are flexible to permit the above-described shifting of the nailing heads to occur relative to the nail pickers.

In the operation of the improved pallet making machine of the present invention in a semi-automatic manner as described above it is merely necessary for the machine operator to selectively actuate clutch 58 to move conveyor 16 to bring a desired portion of the assembled slats and stringers underneath the nailing heads. Thereafter he deactuates the clutch to permit the assembled slats and stringers to remain in position under the nailing head. Thereafter he manipulates lever 155 which in turn sets up the above-described automatic sequence of operation which results in the nailing, delivering of a subsequent nail to the nailing heads, and shifting the nailing heads to stagger such subsequent nail, when driven, relative to the previous nail which was driven.

Figure 20:
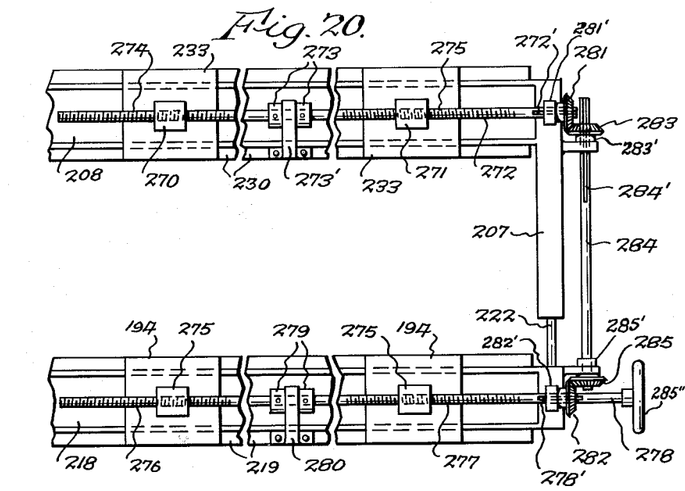
FIG. 20 is a schematic view of a modified embodiment of the present invention and showing a construction for adjusting the nailing machine for different size pallets.

In order to permit the instant nailing machine of the present invention to be used for making pallets of different sizes, the following construction may be utilized, as schematically shown in FIG. 20. The supporting bearings 233 for drivers 215, instead of being fixedly mounted to rear plate 230 as shown in FIG. 15, are mounted on bearings for movement relative thereto. In this respect, a tapped collar 270 extends from the face of left bearing block 233, which mounts the nail driver, not shown, and a tapped collar 271 extends from the face of the right bearing block 233, which also mounts a driver, not shown. A shaft 272 has a central portion with collars 273 fixedly mounted thereon. A lug 273', which is fixedly attached to rear plate 230 extends between collars 273 to prevent shaft 272 from moving in the direction of its longitudinal axis. Right and left hand threads 274 and 275, respectively, are located at opposite ends of shaft 272. The supporting bearings for nailing head chucks 194 have tapped collars 275 extending therefrom for receiving in threaded engagement, right and left hand threads 276 and 277, respectively, of shaft 278 which has collars 279 fixedly mounted thereon for receiving lug 280 therebetween, said lug 280 being affixed to plate 219 on the rear of I beam 218 (FIG. 15). The supporting bearings for nailing head chucks 194 are slidable relative to plate 219 on which they are mounted. It can be seen that by the rotation of shaft 272, the outer nailing head chucks 194 can be moved toward or away from each other to thereby adjust the spacing therebetween. Furthermore, by the rotation of shaft 278 the outer nailing head chucks 194 can be moved toward or away from each other. In order to move the outer bearings which support the drivers and the outer bearings which support the nailing head chucks toward and away from each other in unison in the above-described manner, the following structure is provided. A bevel gear 281 is journaled for rotation in bearing 281' which is mounted on arm 207 depending from the upper I beam.

A spline 272' extends through bevel gear 281 so as to cause bevel gear 281 to rotate in unison with shaft 272 while permitting said shaft to move in the direction of its longitudinal axis relative to bevel gear 281. A bevel gear 282 is journaled for rotation in bearing 282' which is mounted on the lower I beam. A splined connection 278' permits shaft 278 to move in the direction of its longitudinal axis relative to its bevel gear 282 while causing them to rotate in unison. A shaft 284 has its lower end journaled in bearing 285' mounted at the end of the lower I beam and its upper end splined at 284' for receiving a mating connection within bevel gear 283 which is journaled in bearing 283' mounted on arm 207. A hand wheel 285" is provided at the end of shaft 278. It can readily be seen that whenever hand wheel 285" is rotated shaft 278 will rotate in unison therewith. This will cause shaft 284 to rotate and therefore cause shaft 272 to rotate in unison with shaft 278 because of the above-described bevel gear connections. It is the rotation of shafts 278 and 272 which causes the nailing heads, that is, both the portions thereof which support the drivers and the nailing head chucks to move in unison toward and away from each other to thereby adjust the distance of the outer nailing heads relative to each other so that the machine can accommodate different sized pallets. It is to be especially noted that it is the outer two of the driver supports and the outer two of the nailing head chucks which are moved relative to each other while the center driver support and the center nailing head chuck always retain a fixed position. The spline 278' and the spline 272' permit shaft 278 and shaft 272, respectively, to move in the direction of their longitudinal axis when the nailing heads are shifted to cause the staggering of the nails in the manner described in detail above. Furthermore, spline 284' permits relative movement of the upper I beam with respect to the lower I beam during the actual nailing operation which was described in detail above. It is to be especially noted that the bearings 281' and 282' are associated with their mountings in such a manner so that they will not interfere with the movement of the upper and lower bearings in the ways of the frame. In this respect the ways of the frame may be cut away so as to accommodate bearings 281' and 282' while still providing firm support for the bearings mounted at the outer ends of the upper and lower I beams to thereby permit said bearings to be guided in the ways of said frame. Similar construction can be provided for moving the guides which guide the stringers so that they are in alignment with the nailing heads, if desired.

Figure 21:
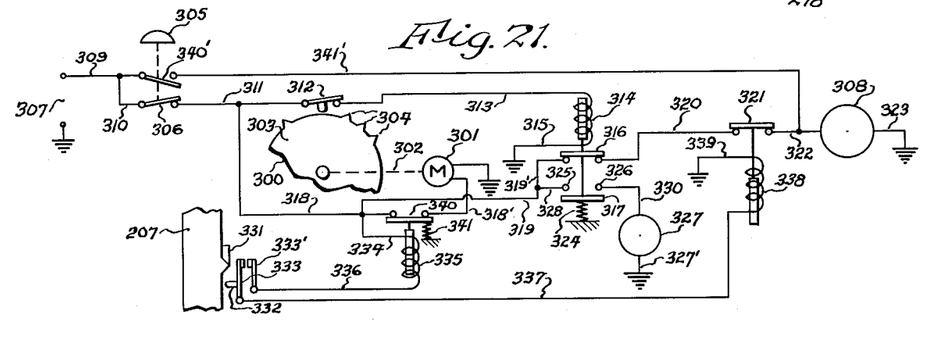
FIG. 21 is an electrical wiring diagram disclosing a circuit which will cause the improved pallet making machine of the present invention to operate in a fully automatic manner.

FIG. 21 is a schematic electrical wiring diagram for causing an improved pallet making machine of the present invention to operate in a fully automatic manner. More specifically, a turntable 300 is provided which is driven by turntable motor 301 through mechanical connection 302. Turntable 300 rotates at a predetermined speed and mounts disk 303 which has a plurality of cams 304 extending therefrom. It is to be noted at this point that different disks having different cam spacings may be used to provide different nailing patterns, as will become more apparent hereafter. In order to operate the pallet making machine in an automatic manner it is merely necessary to actuate switch 305 to cause armature 306 thereof to close a circuit and permit current to flow from source 307 through leads 309 and 310, armature 306, lead 311, normally closed switch armature 312, lead 313, relay coil 314 and lead 315 to ground. The energization relay coil 314 will cause armatures 316 and 317 to assume the position shown in FIG. 21 whereby a circuit will be completed from source 307 through leads 309 and 310, switch armature 306, lead 311, leads 318, 319 and 319', armature 316, lead 320, armature 321, lead 322, conveyor motor clutch 308 and lead 323 to ground. When clutch 308 is energized in the above manner the conveyor motor will cause the conveyor to be driven to thereby advance an assembled pallet toward the nailing heads. Turntable 300 rotates in synchronism with the movement of the conveyor and thus the position of the turnable at any predetermined instant corresponds to a position of the pallet relative to the nailing heads. A point will be reached where one of the cam surfaces 304 of disk 303 engages switch 312 which is located between leads 311 and 313 and said cam surface will cause switch 312 to open. This will occur when a predetermined portion of an assembled pallet has reached a position beneath the nailing heads. The opening of switch 312 will break the circuit to relay coil 314 and cause armature 316 to open the circuit between leads 319' and 320 as a result of the expansion of spring 324 and therefore disrupt the flow of current through clutch 308. As a result clutch 308 will be deenergized and the conveyor will stop. However the deenergization of relay coil 314 and the expansion of spring 324 will cause armature 317 to move into position to bridge contacts 325 and 326 whereupon a circuit will be completed from source 307 through leads 309 and 319, switch armature 306, leads 311, 318, 319, and 328, relay armature 317, lead 330, single revolution clutch 327 and lead 327' to ground. Single revolution clutch 327 is of the conventional type which will rotate for one revolution and thereafter automatically become deenergized. Clutch 327 corresponds to single revolution clutch 151 described above and will cause the crank arrangement which actuates the nailing heads, in the manner described above, to cause arms 207 mounted in the ways of the machine to move downwardly, said arms being mounted at the ends of upper I beam 208 (FIG. 14). In other words, the energization of single revolution clutch 327 will cause a nail driving operation to ocur. A cam 331 is mounted on one of arms 207 and after the downward movement of said arm is started, cam 331 will engage cam follower 332 on switch armature 333 of switch 333' and cause a circuit to be completed from source 307 through leads 309 and 310, armaturs 306, leads 311, 318 and 334, relay coil 335, lead 336, switch 333', lead 337, relay coil 338 and lead 339 to ground. The energization of relay coil 335 will cause armature 340 to move downwardly to thereby disrupt the flow of current between leads 318 and 318', said movement of armature 340 being effected against the bias of spring 341. The disrupting of the flow of current between leads 318 and 318' will cause turntable driving motor 301 to stop and switch 312 actuated by cams 304 on turntable disk 303 will remain open. Furthermore the energization of relay coil 338 will cause armature 321 to move to a position where it disrupts the flow of current between leads 320 and 322. This will cause the circuit to conveyor motor 308 to be opened in addition to the opening effected by armature 316 noted above. The action of relay armature 321 is as a safety factor to prevent conveyor clutch 308 from being energized under any circumstances during the operation of the nailing heads. In other words movement of the turntable 300 or the conveyor is positively prevented during the operation of the nailing heads as a result of the closing of switch 333'. After cam 331 disengages cam follower 332, that is, after a nailing action has been completed and arms 207 have been moved to their uppermost position, switch 333 will open to thereby deenergize relay coils 335 and 338 and permit the armatures associated therewith to return to the position shown in FIG. 21. At this point it will be noted that switch 312, which is actuated by the turntable, is still open. However single revolution clutch 327 will be deenergized because of its own internal mechanism, notwithstanding that armature 317 still bridges contacts 325 and 326. Furthermore conveyor clutch 308 will still be deenergized because armature 316 does not permit conduction between leads 319' and 320 while relay coil 314 remains deenergized. However the opening of switch 333' will cause the deenergization of relay coil 335 and therefore cause armature 340 thereof to again establish a circuit between leads 318 and 318' to thereby energize turntable motor 301. The continued rotation of turntable motor 301 will cause one of the cams 304 which was holding switch armature 312 open to move out of engagement with said switch armature and thereby cause switch armature 312 to close the circuit between leads 311 and 313 to thereby again energize relay coil 314 and thereby cause it to return to the position shown in FIG. 21. This will again cause the establishment of the above described circuit to conveyor clutch 308 which will cause said conveyor to continue movement in synchronism with the movement of turntable motor 301. The time that the conveyor motor clutch 308 operates, after switch 312 is closed, to advance the pallet after the above described nailing action will depend on the spacing between the previous cam 304 which actuated switch 312 and the subsequent cam 304. When the subsequent cam 304 again opens switch 312 the above described cycle of operation will be repeated to cause an additional nailing action. In the event that the turntable disk 303 is not in exact synchronism with the conveyor, an arrangement is provided for advancing the conveyor without advancing the turntable motor to thereby place the conveyor and the turntable in synchronism. More specifically, by manipulating switch 305 to cause armature 340' to establish communication between leads 309 and 341', a circuit can be established directly to conveyor motor clutch 308 to thereby cause the conveyor to move. However it will be noted that armature 340 of switch 305 is mounted on the same shaft as armature 306. Therefore the closing of armature 340 will automatically cause the opening of armature 306 to thereby prevent any portion of the control circuit from operating when the conveyor is advanced by the above described procedure of closing armature 340.

Further relative to the above described circuit, assume that the spacing between angle irons 70 (FIG. 4) is 60 inches and assume that one entire revolution of turntable 300 is desired between pallets. Therefore each inch between adjacent angle irons 70 corresponds to 6° of rotation of the turntable. By referring to FIG. 4 assume that the leading edge of the pallet approaching the nailing heads is 20 inches from the angle iron 70 which precedes it. Therefore there will be a space on the disk 303 which is 20×6 or 120° without a cam 304. Further assuming that the first nail to be driven is 2 inches from the end of the pallet this is equivalent to 2×6 or 12°. Therefore the first cam, after the initial start of rotation of the turntable will be located at 120 plus 12 or 132° from the start. At this point switch 312 (FIG. 21) will be opened and the above described nailing action will occur. Assume that the next nail is to be driven 2 inches from the first nail. Therefore the spacing between first cam 304 and second cam 304 will be 2×6 or 12° from the first cam and the nailing machine will be actuated at 132 plus 12 or 144° from the start of rotation. Thus by the spacing of the cams 304 on disc 303, a desired nailing pattern can be provided in an automatic manner. As noted above, by the use of different discs with different spacings of cams thereon the improved pallet making machine of the present invention may be programmed to provide any desired nailing pattern and thus is perfectly capable of operating on different sized pallets or for providing different nailing patterns for the same size pallets.

Reference is now made to FIG. 10 wherein a modified type of nail picker plate 187' is shown. This nail picker plate differs from nail picker plates 187 in that it has only one nail receiving slot 188' therein, the remainder of the edge of nail picker plate 187' constituting a nail blocking surface 190' which prevents a nail from leaving the chute leading to the nail picker plate. If nail picker plate 187' is substituted for the nail picker plate 187 which is centrally located between the outer two nail picker plates then nail receiving slot 188' will receive a nail on every other oscillation of the nail picker plates and therefore cause only one nail to be driven through the central stringer for every two nails which are driven into the outer stringers. In this manner nails may be conserved in that only approximately half of the nails which are driven into each end of the pallets are driven through the central portion thereof.

Further relative to the embodiment of FIG. 21 it is to be noted that a circuit (not shown) may be provided for energizing single revolution clutch 327 without in any way energizing any other components of this circuit. The purpose for this procedure is to enable a machine operator to selectively actuate the nailing heads to manually drive additional nails or for testing the nailing heads without advancing the conveyor. In the foregoing respect a direct lead may be provided from the source of electricity to lead 330 leading to single revolution clutch 327. A switch (not shown) may be provided in the above-mentioned lead and this switch may be tied in with switch 305 so that upon the energization of single revolution clutch 327 by itself switch armatures 306 and 340' will be in a position where they will not permit the circuit to be competed to either the conveyor motor clutch or to the turntable motor. Thus it can be seen that the circuit of FIG. 21 is capable of providing automatic operation of the entire machine, as described in detail above, or is capable of permitting sole operation of the conveyor by the energization of conveyor motor clutch 308, or is capable of permitting the sole energization of single revolution clutch 327 without accompanying operation of the remainder of the components of the system.

While the present invention has been described primarily with respect to the making of pallets, it will readily be understod that it may be generally used for nailing any types of objects together, especially where it is necessary that the nails be staggered to avoid splitting of the objects.

While preferred embodiments of the present invention have been disclosed it will readily be appreciated that the present invention is not necessarily limited thereto, but may be otherwise embodied within the scope of the following claims:

We claim:
1. A pallet making machine for nailing slats to stringers comprising a frame, conveyor means mounted relative to said frame, a plurality of nailing head means mounted relative to said frame, said nailing head means being spaced from each other and extending transversely of the direction of feed of said conveyor means, means for causing said nailing head means to drive first nails through said slats and stringers to thereby join said slats and stringers, linkage means for causing said nailing head means to move transversely of the direction of feed of said conveyor, and means operable after the driving of said first nails for actuating said linkage means to thereby cause second nails which are driven through said slats and stringers by said nailing head means to be staggered with respect to said first nails whereby said first and second nails will not penetrate the same grain of said stringers.

2. A pallet making machine comprising a bed for supporting an assembled pallet consisting of a plurality of spaced stringers and a plurality of slats extending transversely to said stringers, a frame, a plurality of nailing head means spacedly mounted on said frame and extending transversely of the direction of feed of said pallet on said bed, means for causing said nailing head means to drive first nails through certain of said slats and stringers, linkage means for causing said nailing head means to shift transversely of the direction of feed of said pallet, and means operable after the driving of said first nails and prior to driving of second nails through certain of said slats and stringers for actuating said linkage means whereby said second nails will be in staggered relationship to said first nails to thereby preclude said first and second nails from entering the same grain of either said slats or stringers to thereby obviate the possibility of splitting of either of said slats or stringers.

3. A pallet making machine as set forth in claim 2 including nail picker means for selectively delivering single nails to each of said nailing heads between cycles of driving said nails.

4. A pallet making machine as set forth in claim 3 including means operatively associated with said bed for intermittently feeding said pallet longitudinally of said bed after each nail driving action.

5. A pallet making machine as set forth in claim 4 wherein each said nailing head means includes a nailing head chuck and wherein each of said nail pickers include a guide for holding a plurality of nails, a plate oscillatable transversely of each of said guides and located at the end thereof, said plate including a nail blocking surface and a nail receiving means, second linkage means operable in timed relationship with said nailing heads for selectively causing a nail which is held in said nail receiving means to be moved from a position proximate the end of said guide while said nail blocking surface prevents a subsequent nail from being removed from said guide, and a nail transmitting chute positioned in operative relationship to said nail picker for receiving said nail removed from the end of said guide and transmitting said nail to said nailing head chuck after said nail receiving surface reaches a predetermined location.

6. A pallet making machine as set forth in claim 5 wherein certain of said plates include a plurality of spaced nail receiving surfaces therein for discharging nails from said guide into said chute with every cycle of said nailing head means and wherein certain of said plates have nail receiving means which is operable intermittently to deliver nails from said guide to said chute on alternate cycles of said nailing head means.

7. A nailing machine for driving nails through juxtaposed objects to thereby fasten said objects comprising bed means for supporting said juxtaposed objects, frame means, a pedestal on said frame means above said bed means, nailing head means mounted on said frame means above said bed means, motor means mounted on said pedestal, linkage means mounted on said frame means above said nailing head means and supported by said pedestal for selectively actuating said nailing head means from said motor means whereby said nailing head means are caused to drive a nail through said juxtaposed objects on said bed, said location of said linkage means above said nailing head means preventing interference of said bed with said linkage means.

8. A nailing machine as set forth in claim 7 wherein said bed means comprises a movable conveyor, and means operatively associated with said conveyor for moving said conveyor and said juxtaposed objects past said nailing head means to thereby position said juxtaposed objects relative to said nailing head means.

9. A conveyor table for feeding an assembled pallet consisting of slats and stringers to a nailing mechanism comprising outer guide means extending in the direction of feed of said conveyor for positively guiding outer surfaces of spaced stringers relative to each other during the movement thereof longitudinally on said conveyor in the directions of the longitudinal axes of said stringers and relative to said outer guide means, and inner yieldable guide means extending in the direction of feed of said conveyor for engaging inner facing surfaces of said stringers during relative movement between said stringers and said inner guide means, said inner guide means maintaining said outer surfaces of said stringers in abutting relationship with said outer guide means whereby said conveyor table can accommodate and transport stringers having dimensional variations along their length while maintaining a close tolerance of the dimension between the outer surfaces of said stringers.

10. A pallet making machine for fabricating a pallet by securing a plurality of slats to a plurality of stringers extending transversely thereto comprising conveyor means for supporting said assembled pallet and for selectively moving said assembled pallet, nailing head means for driving nails through said assembled slats and stringers, control means for effecting movement of said conveyor past said nailing heads and for selectively actuating said nailing heads to thereby cause said nailing heads to intermittently drive said nails after movement of said conveyor past said nailing heads, linkage means for effecting relative shifting of said nailing head means and said pallet in a direction transverse to the movement of said conveyor means, and means operable after the driving of said nails to actuate said linkage means to thereby cause nails subsequently driven by said nailing head means to occupy a staggered relationship in said stringers relative to previously driven nails.

11. A pallet making machine for securing a plurality of slats to a plurality of stringers to thereby form a pallet comprising conveyor means for supporting a plurality of assembled slats and stringers and for moving said assembled slats and stringers in the direction of the longitudinal axes of said stringers, a frame, a plurality of spaced nailing head means mounted on said frame and extending transversely of the direction of feed of said stringers, control means for automatically advancing said assembled slats and stringers past said nailing head means and for intermittently actuating said nailing head means after predetermined increments of travel of said conveyor means to thereby drive a plurality of adjacent nails through each of said slats and into said stringers in predetermined spaced relationship longitudinally of said stringers, and means for effecting relative transverse movement between said nailing head means and said stringers between the successive driving of said plurality of adjacent nails through each of said slats and into said stringers to thereby cause said plurality of adjacent nails to occupy a staggered relationship relative to each other longitudinally of said stringers to thereby prevent a plurality of adjacent nails from entering the same grain of a stringer whereby the tendency for splitting of said stringers is obviated.

12. A nailing machine comprising a frame, nailing head means mounted on said frame, said nailing head means including a nail driving portion and a nailing head chuck portion, motor means, first linkage means operatively driven by said motor means for moving said nail driving portion relative to said nailing head chuck portion to thereby drive a first nail held by said nailing head chuck portion, second linkage means driven by said motor means and operable in timed relationship to said first linkage means for feeding a second nail to said nailing head chuck portion after the completion of the driving of said first nail, and third linkage means driven by said motor means in timed relationship to said first and second linkage means for shifting said nailing head means relative to said frame means after the driving of said first nail has been completed to cause said second nail to be driven in staggered relationship relative to said first nail.

13. A pallet making machine for nailing slats to stringers comprising a frame, conveyor means mounted relative to said frame, a plurality of nailing head means mounted relative to said frame, said nailing head means being spaced from each other and extending transversely of the direction of feed of said conveyor means, motor means, first linkage means effectively coupled to said motor means for selectively actuating said nailing head means from said motor means to drive first nails through said slats and stringers to thereby join said slats and stringers, and second linkage means effectively coupled to said motor means and operable after the driving of said first nails for causing said nailing head means to move transversely of the direction of feed of said conveyor to thereby cause second nails which are driven through said slats and said stringers by said nailing head means to be staggered with respect to said first nails whereby said first and second nails will not penetrate the same grain of each of said stringers at locations substantially adjacent to each other.

14. A nailing machine for driving nails through juxtaposed objects to thereby fasten said objects comprising bed means for supporting said juxtaposed objects, frame means, nailing head means mounted on said frame means, motor means, linkage means mounted on said frame means above said nailing head means for selectively actuating said nailing head means from said motor means whereby said nailing head means are caused to drive a nail through said juxtaposed objects on said bed, said location of said linkage means above said nailing head means preventing interference of said bed with said linkage means, said nailing head means comprising a plurality of nailing heads mounted on said frame means in transverse relationship to said bed means, means for selectively actuating said nailing head means to drive first nails through said juxtaposed objects, and means for shifting said nailing head means transversely of said bed after the driving of said first nails to cause second nails which are driven into said juxtaposed objects by said nailing head means to occupy a staggered relationship to said first nails.

15. A nailing machine for automatically driving nails into an object in predetermined spaced relationship relative to each other comprising a conveyor for feeding said object, a nailing head mounted in operative relationship to said conveyor, control means including programming means for automatically selectively advancing said conveyor relative to said nailing head and for automatically selectively actuating said nailing head when said object occupies predetermined relationships relative to said nailing head whereby nails driven by said nailing head occupy a predetermined spaced relationship relative to each other after having been driven into said object, and means operatively associated with said nailing head for shifting said nailing head laterally relative to the direction of feeed of said conveyor to thereby cause nails which are driven by said nailing head to be staggered laterally relative to each other in addition to being spaced relative to each other as a result of the operation of said control means which include said programming means.

References Cited by the Examiner

UNITED STATES PATENTS

| 864,955 | 9/07 | Craig | 1—146 |
|---|---|---|---|
| 982,854 | 1/11 | Ott | 1—1 |
| 1,360,384 | 11/20 | Erickson | 1—6 |
| 1,994,798 | 3/35 | Twomley | 1—151 |
| 2,097,499 | 11/37 | Newhouse | 1—151 |
| 2,273,268 | 2/42 | Hunter | 1—6 X |
| 2,540,934 | 2/51 | Cook et al. | 1—6 X |
| 2,639,427 | 5/53 | Cable | 1—151 |
| 2,642,099 | 6/53 | Schaub | 1—386 |

GRANVILLE Y. CUSTER, JR., *Primary Examiner.*